May 19, 1970  J. K. HALE  3,512,424
CHAIN
Filed June 6, 1968  2 Sheets-Sheet 1
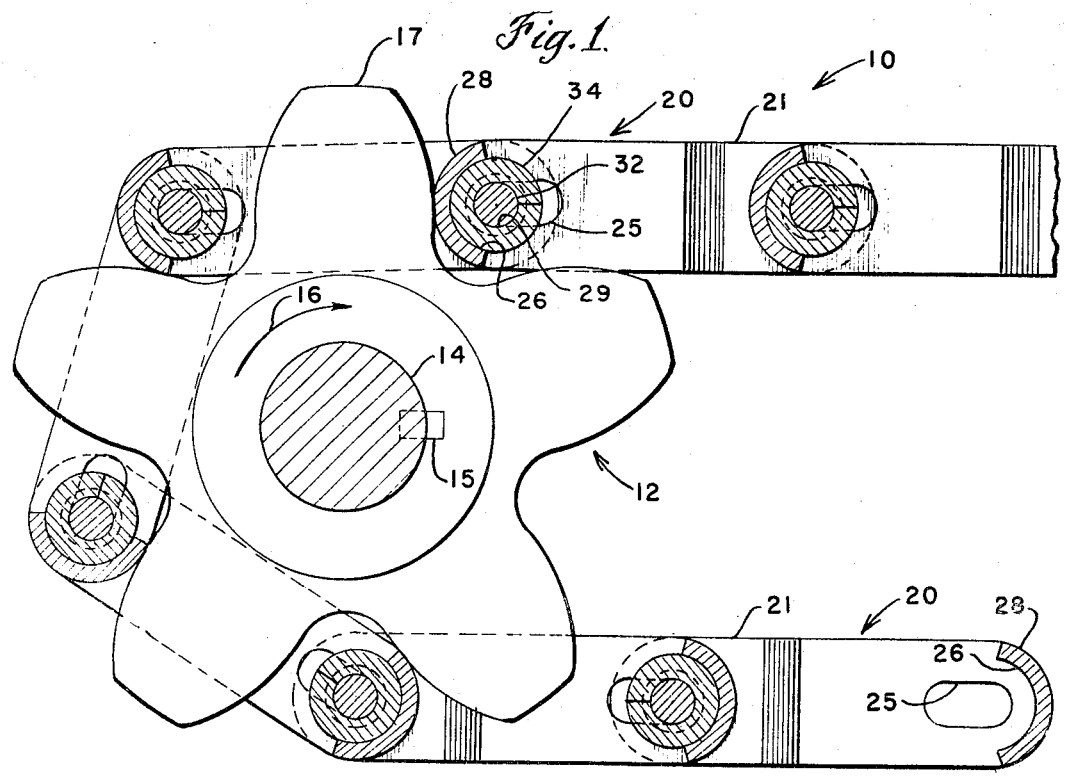
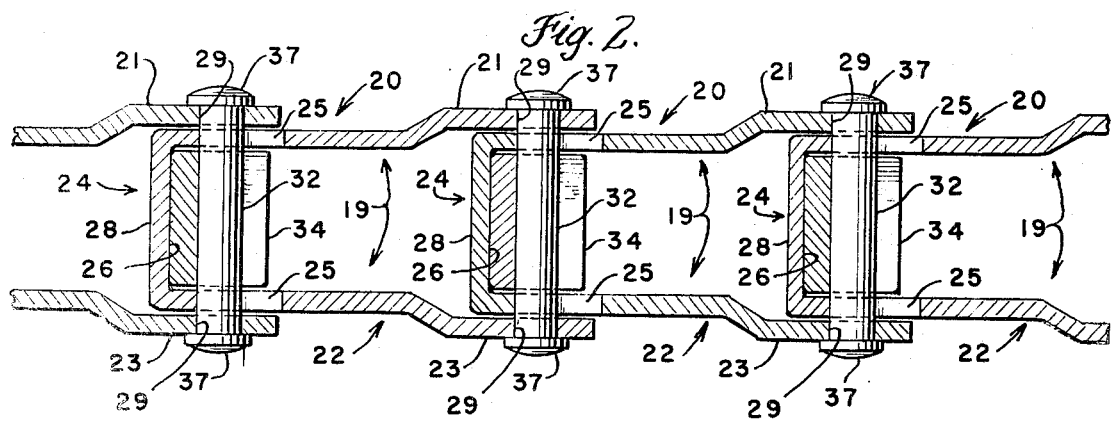
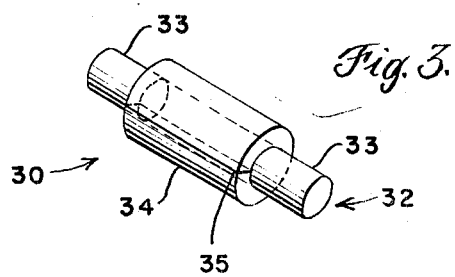
INVENTOR.
JOHN K. HALE
BY
Donald D. Schaper
ATTORNEY

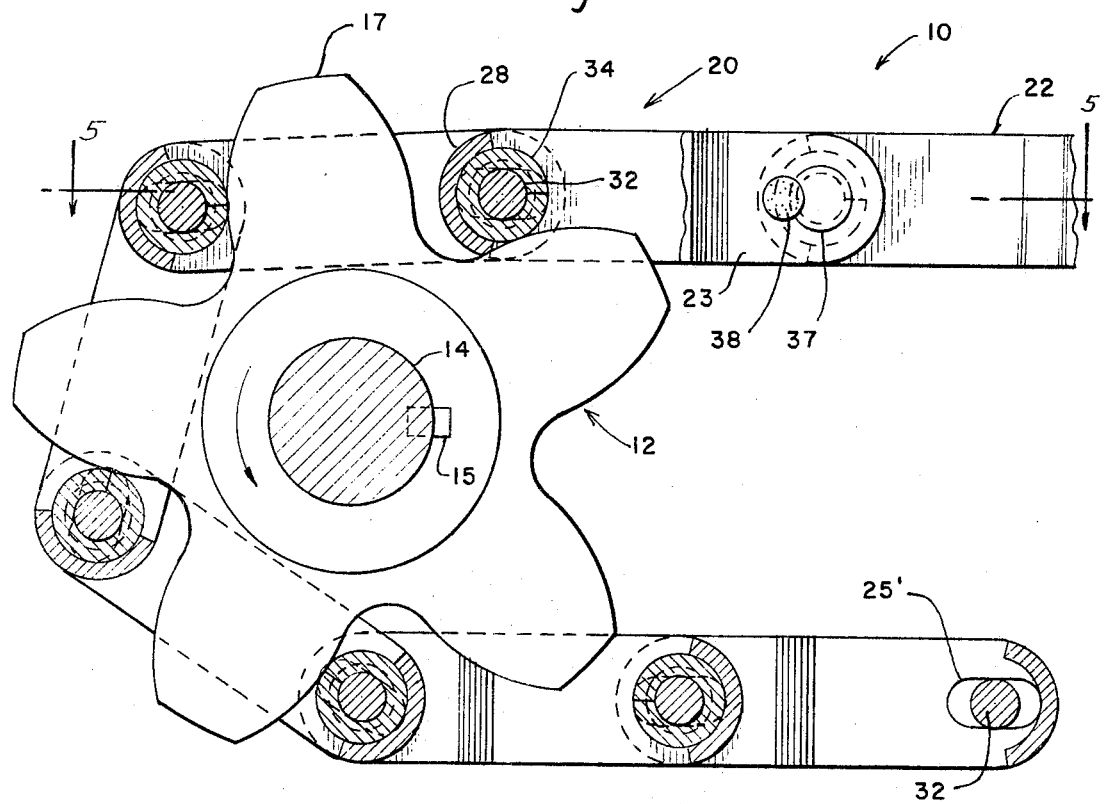
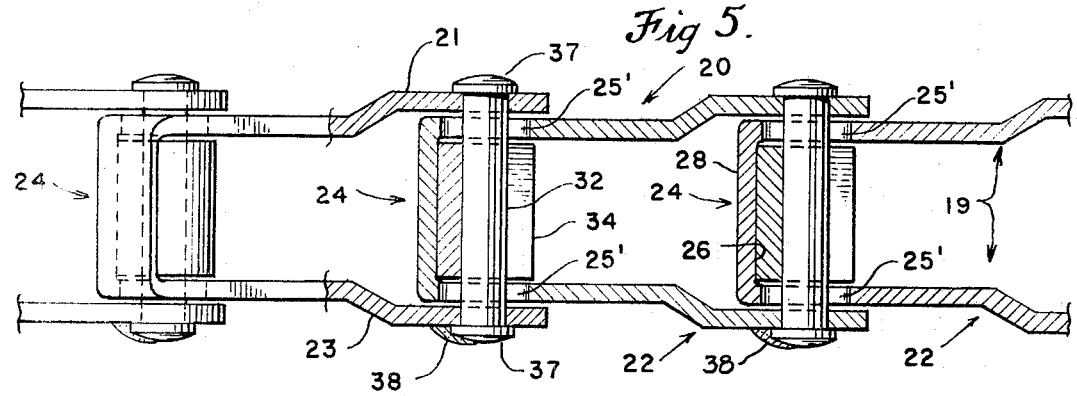
INVENTOR.
JOHN K. HALE
BY
John E. Becker
ATTORNEY

United States Patent Office 3,512,424
Patented May 19, 1970

3,512,424
CHAIN
John K. Hale, New Holland, Pa., assignor to Sperry Rand Corporation, New Holland, Pa., a corporation of Delaware
Continuation-in-part of application Ser. No. 493,039, Oct. 5, 1965. This application June 6, 1968, Ser. No. 738,374
Int. Cl. F16g 13/06
U.S. Cl. 74—255
15 Claims

ABSTRACT OF THE DISCLOSURE

An improved chain having a series of U-shaped members with a closed end of one member being received in the open end of the next adjacent member, and a pintle having an enlarged center section with smaller diameter ends passing through the two adjacent link members to bind them together. The pintle is carried in axially-aligned, close fitting apertures formed in each side adjacent the open end of the link and in axially aligned elongated slots formed adjacent the closed end of each U-shaped link member which permits movement of the link member relative to the pintle and thus provides a means for breaking the chain loose in the event that the links should tend to freeze. The enlarged center section provides added strength to the pintle and permits practical reverse driving of the chain without binding and uneven action.

BACKGROUND OF THE INVENTION

This is a continuation-in-part of J. K. Hale application Ser. No. 493,039 filed Oct. 5, 1965, now abandoned. This invention relates to pintle chain of the flat link type and more particularly to a novel construction and arrangement of the pintle with respect to the links employed in such chain.

One commonly employed type of pintle chain comprises a plurality of U-shaped members arranged in longitudinal series with the closed end of one member partially received in the open end of an adjacent member and a pintle extending through aligned apertures in each pair of registering elements to pivotally join them together. Each U-shaped member is formed with a pair of generally parallel side plates and a cross bar extending between the side plates, the cross bar being arcuate shaped in cross section and contacting the pintle along a line parallel to the pintle axis. Elongated openings in the side plates adjacent the cross bar or bight end of the link permit movement of the pintle away from the cross bar to provide a means for breaking the chain loose, in the event the links freeze up under dirty or corrosive conditions. In another known type of pintle chain, the cross bar is cylindrical with the pintle completely enclosed so that the chain may be reverse driven.

Both of the pintle chains described above work well under most operating conditions, but there are certain applications where neither of the chains is suitable. Chains having links with arcuate-shaped cross bars and elongated openings for the pintles is very effective under dirty and corrosive conditions; however, problems exist with this chain when it is necessary to reverse drive the chain, and the chain tends to stretch after hard use due to small bearing area between the pintle and the cross bar. Chains of the type with cylindrical cross bars can be reverse driven, but they are considerably more expensive and tend to freeze up under dirty or corrosive conditions since foreign material is trapped in the closed cross bar.

SUMMARY OF THE INVENTION

This invention is directed to an improved flat link chain of the general character described, which embodies a plurality of series connected U-shaped members each formed with a pair of generally parallel side plates and a cross bar or bight section extending between the side plates, the cross bar being arcuate shaped in cross section and contacting an enlarged medial section of the pintle along a line parallel to the pintle axis. The bight portions of the links have upper and lower continuous edges blending integrally with the side plates, said side plates being further provided with transversely aligned pin-receiving openings therein adjacent its open and closed end. Said openings in the side plates adjacent the cross bar or bight portion are of elongated slot formation which permit the pintle to move away from the cross bar to provide a means for breaking the chain loose. The improved pintle construction is achieved by press fitting an enlarged cylindrical sleeve onto a uniform diameter pintle pin, with the enlarged center portion having a cylindrical surface for complementally engaging the arcuate bight portion of the link whereby the respective links shall journal on the arcuate surfaces of the center portion in a manner whereby the link pin shall be retained in spaced relation to the edges of the slot.

Accordingly, one object of this invention is to provide a pintle chain of the character described which is relatively inexpensive and is particularly adapted for use under dirty and corrosive conditions.

Another object of this invention is to provide such a chain having links of the character described which may be driven both fore-and-aft along the longitudinal center line of the chain, said enlarged center area of the pintle providing a re-enforced area to resist the stress of reverse driving and further enabling the same to be reversely driven without binding and uneven action.

A further object of this invention is to provide an improved chain link of the character described with a novel and improved pintle formation.

A still further object of this invention is to provide a chain of the character described which has improved wear characteristics and is resistant to stretching.

Other objects of this invention will be apparent hereinafter from the specification and the recital of the appended claims, taken in conjunction with the accompanying illustrative drawings.

DESCRIPTION OF THE DRAWINGS

FIG. 1 is a sectional view of one embodiment of a chain of the present invention in engagement with a sprocket wheel which normally rotates in the direction of the arrow;

FIG. 2 is a top view partially in plan and partially in cross-section and showing the U-shaped members arranged in longitudinal series, with a pintle in engagement with the cross bar inside surfaces thereof;

FIG. 3 is an isometric view of the pintle and showing the cylindrical pin with a bushing fitted thereon;

FIG. 4 is a sectional view similar to FIG. 1 but showing a chain of modified embodiment with the sprocket wheel rotating in a reverse direction for reverse driving of the chain; and FIG. 5 is a view similar to FIG. 2, partially in plan and partially in cross-section shown in the modified U-shaped link members with the slotted apertures having their respective edges spaced from the pintle pin.

DESCRIPTION OF FIRST EMBODIMENT

Referring now to the drawings by numerals of reference, and particularly to FIG. 1, a chain 10 constructed according to this inevntion is shown in combination with a sprocket wheel 12 which is mounted on a shaft 14 and fixed thereto by key 15. Sprocket 12 is formed with symmetrical teeth 17, and is normally driven in a clockwise direction, as shown by arrow 16.

Each link in chain 10 comprises a U-shaped member 19 having a pair of spaced, oppositely disposed side plates 20 and 22 and a cross bar 24 extending between and joining the side plates 20 and 22 to form a closed end. Cross bar 24 forms a bight portion having upper and lower continuous edges with the sides, is arcuate in cross-section, as shown in FIG. 1, and is formed about an axis extending perpendicular to the longitudinal axis of chain 10. A concave inside surface 26 on cross bar 24 faces toward the open end of the U-shaped member 19 and a convex outside surface 28 is oppositely disposed from inside surface 26. Side plates 20, 22 have offset end portions 21, 23 to receive the closed end of the next adjacent U-shaped member 19. Axially aligned slots 25 are formed in the side plates adjacent the cross bar 24 and axially aligned holes 29 are formed in end portions 21, 23. As shown in FIG. 2, slots 25 and holes 29 register with each other adjacent links to form a set of openings for receiving pintle 30.

Pintle 30 (see FIG. 3) consists of a pin 32 and a bushing 34 press fitted thereon. Bushing 34 forms the center section of pintle 30 and the ends of pin 32 which project from bushing 34 form the end portions 33 of pintle 30. Bushing 34 may be split at 35 to facilitate assembly of the bushing on pin 32.

Chain 10 is assembled by first placing U-shaped members 19 in registering relationship, with the slots 25 of a first member in axial alignment with holes 29 of an adjacent U-shaped member. The next step is to position bushing 34 in contact with inside surface 26 of cross bar 24. Pin 32 is then pressed through holes 29, slots 25, and bushing 34. Subsequently the end portions 33 are upset or peened as shown at 37, to form a riveted connection.

An important feature of this invention is the novel design of pintle 30, and the manner in which the pintle coacts with the link U-shaped member. Bushing 34 has the same radius of curvature as the cross bar's inside surface 26 so that it bears against surface 26 over substantially its entire area. The wide bearing area obtained by this arrangement greatly increases the life of the chain and prevents stretching of the links. It will also be noted that the chain of this invention, in addition to having improved wear characteristics obtained by an enlarged pintle center section, also provides for realtive longitudinal movement of the links to prevent "freezing" of the links under certain operating conditions. Slots 25 and end potrions 33 therein cooperatively provide for this movement.

Referring to FIGS. 4 and 5, the same reference numbers apply throughout with the exception that the changed corresponding parts will be primed. This second embodiment differs from that of FIGS. 1 and 2, first, in respect to the disposition of the elongated slot, designated 25', with the rest of the components remaining substantially the same. The slots 25' are only a sliding fit larger in the narrow dimension thereof than the diameter of the pin 32. In this embodiment it is apparent that the slotways, while still axially aligned with holes 29, are disposed more toward the closed bight end of the link so that when the pin 32 of the pintle assembly 30 is assembled with the links, the ends 33 of the pin are in spaced non-bearing relationship to the ends of said slots 25'. This will assure greater protection against link freeze up as well as reduce bearing friction in the immediate area of the slot edge.

The chain links are assembled in the same general manner for this embodiment as in the first described one. Also, after inserting the pintle and upsetting the end portions 33 as shown at 37 to form the riveted connection, the pin ends are welded as at 38 to preclude their turning and wearing in holes 29. This is preferable in both embodiments.

In operation, sprocket 12 is normally driven in the direction of arrow 16 as shown in FIG. 1 to move the top portion of chain 10 toward the right, as viewed in FIG. 1. It is, of course, understood that chain 10 could be used to drive sprocket 12. As sprocket 12 rotates in the direction of arrow 16, link surfaces 28 are contacted by the symmetrical teeth 17, and the forward movement is transmitted through the pintle 30 and side bars 20 and 22 to advance the chain. In applications where it is desired to reverse drive chain 10, the sprocket teeth 17 will directly contact the enlarged diameter of bushings 34 as shown in FIG. 4. The large diameter bushings 34 permit the chain to be reverse driven without binding and uneven action.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A chain link comprising a pair of spaced oppositely disposed side plates, a cross bar extending between and joining said side plates to form a U-shaped member, said U-shaped member having an open end opposite said cross bar, said cross bar being arcuate shaped in cross-section and formed about an axis extending between said side plates, said cross bar having an inside surface facing said open end, each of said side plates having a slot therein located adjacent said cross bar, said slots being in axial alignment, a pintle extending through said slots and being freely movable therein in a direction along the longitudinal axis of said link, said pintle having a longitudinal center axis parallel to the axis of said cross bar, said pintle having two end portions and a center section between said end portions, said center section having a greater cross-sectional area than said end portions, and said center section having an ouside surface engageable with said cross bar inside surface over substantially the entire area of said inside surface to provide a large bearing area between said pintle and said U-shaped member.

2. A chain link, as recited in claim 1, wherein said slots extend longitudinally along said side plates and have a first end adjacent said cross bar and a second end opposite therefrom, said pintle end portions are received in said slots, and when said end portions are in engagement with said slot first ends said center section is in engagement with said cross bar.

3. A chain link, as recited in claim 1, wherein said center section is cylindrical, and the axis of said pintle is coincident with the axis of said cross bar when said center section is in engagement with said cross bar.

4. A chain link, as recited in claim 1, wherein said pintle comprises a cylindrical pin and a hollow bushing press fitted thereon intermediate the ends of the pintle, said end portions being defined by the medial placement of the bushing on said cylindrical pin, and said center section being formed by said bushing.

5. A chain comprising a plurality of links arranged in longitudinal series, each of said links comprising a pair of spaced oppositely disposed side plates, a cross bar extending between and joining said side plates to form a U-shaped member, said U-shaped member having a closed end adjacent said cross bar and an open end opposite said closed end, the distance between the side plates at said open end being equal to the outside width of said member at said closed end so that the closed end of one link is received in the open end of an adjacent link in said series, said cross bar being arcuate shaped in cross-section and formed about an axis extending between and perpendicular to said side plates, said cross bar having an inside surface facing said open end, each of said side plates having a slot therein located adjacent said cross bar and a hole therein located adjacent said open end, said slots of each link being in axial alignment with each other and said holes of each link being in axial alignment with each other, the holes and slots of adjacent links in said series being in axial alignment to form a set of openings, a pintle through each set of openings, said pintle having two end portions and a center section between said end portions, said center section having a greater cross-sectional area than said end portions, and said center section having an ouside surface engageable with said cross bar inside surface over substantially the entire area of said inside surface to provide a large bearing area between said pintle and said U-shaped member.

6. A chain, as recited in claim 5, wherein said chain is adapted to be driven by a sprocket wheel having a plurality of symmetrical teeth around its outer periphery, the teeth on said sprocket wheel being adapted to successively project through said U-shaped members, and said sprocket teeth being engageable with said cross bars to drive said chain in one direction and engageable with said center sections to drive the chain in an opposite direction.

7. A chain link comprising: a U-shaped link member having opposite side portions opening at one end and closed at the opposite end by a bight portion with an inner surface facing the open end and an outer surface, the bight portion being arcuate shaped and formed substantially about an axis parallel to the bight portion; a pair of transversely aligned slots in the side portions adjacent the bight portions extending longitudinally of the side portions; a link pin extending through the slots and between the sides; a bushing member fixed to the pin with opposite ends closely adjacent the respective inner surfaces of the side portions and having an outer surface complementary to and engaging the inner arcuate surface of the bight portion, the bushing member further retaining the pin spacedly between the opposite longitudinal ends of the slots.

8. A chain comprising: a series of aligned U-shaped chain links having transverse bight portions and opposite longitudinally extending sides with the open ends lying alongside the closed ends of adjacent links, and the sides and bight portions have upper and lower continuous edges, each link being further characterized by having transversely aligned pin-receiving openings in the sides adjacent its open end and transversely aligned longitudial slots adjacent its closed end; link pins at the ends of the links, with each pin extending through the openings at the open end of a link and the slots at the closed end of an adjacent link; and bushing members fixedly supported on the link pins between the sides and engaging the bight portions whereby the respective bight portions shall bear against the surfaces of the bushing members and the link pins shall be retained in spaced relation to the ends of the slots.

9. A chain comprising: a series of aligned U-shaped chain links having transverse bight portions and opposite longitudinally extending sides with the open ends lying alongside the closed ends of adjacent links, and the sides and bight portions have upper and lower continuous edges, each link being further characterized by having transversely aligned pin-receiving openings in the sides adjacent its open and closed ends; link pins at the ends of the links, with each pin extending through the openings at the open end of a link and the openings at the closed and of an adjacent link; and spacer members fixedly supported on the link pins between the sides and engaging the bight portions whereby the respective bight portions shall bear against the surfaces of the spacer members and the link pins are retained out of contact with the bight portions.

10. A pin and link structure for use in a link chain comprising: a U-shaped link member having opposite upright sides open at one end and closed at the other end by an upright transverse bight portion extending between the sides; a pair of transversely aligned pin-receiving openings in the sides adjacent the open and closed ends; and a transverse pin structure extending through the pin-receiving openings adjacent the closed end the pin structure having small end portions smaller than the respective openings adjacent the closed end disposed in the latter openings and projecting outwardly of the sides for insertion in the openings at the open end of an adjacent link, and a large central portion between the sides bearing against the bight portion and for retaining the end portions out of contact with the edges of the pin-receiving openings adjacent the closed end.

11. The invention defined in claim 10 in which the large central portion is a cylindrical shaped bushing mounted on a pin to move therewith, and the opposite end portions of the pin are the portions extending through the openings.

12. The invention defined in claim 11 further characterized by the bight portion being arcuate shaped with an arcuate inner surface substantially of the radial dimension of the bushing outer surface.

13. The invention defined in claim 10 in which the pin-receiving openings at the closed end of the link are sufficiently large to permit longitudinal movement of the pin structure in respect to the sides and upon the central portion being in contact with the bight portion the end portions are out of contact with the edges of the openings.

14. The invention defined in claim 10 in which the pin-receiving openings at the closed end of the link are longitudinal slots permitting longitudinal movement of the pin structure in respect to the sides and upon the central portion being in contact with the bight portion the end portions are out of contact with the ends of the slots.

15. The invention defined in claim 10 in which the openings at the closed end of the link are sufficiently large to permit movement of the end portions within the openings and the large central portion is larger than the openings and has radial shoulders closely adjacent the respective sides.

References Cited

UNITED STATES PATENTS

| | | | |
|---|---|---|---|
| 441,815 | 12/1890 | Appleby | 74—255 |
| 449,997 | 4/1891 | Brampton | 74—255 |
| 1,105,288 | 7/1914 | Morse | 74—255 |
| 1,826,351 | 10/1931 | Hoefen | 74—245 |
| 3,054,301 | 9/1962 | Kummerer et al. | 74—250 |
| 3,192,785 | 7/1965 | Pearson | 74—255 |
| 3,359,814 | 12/1967 | Kummerer et al. | 74—245 |

JAMES A. WONG, Primary Examiner